(12) United States Patent
Haas et al.

(10) Patent No.: US 7,690,102 B2
(45) Date of Patent: Apr. 6, 2010

(54) APPARATUS FOR PRODUCING PILLOW-SHAPED, PREFERABLY FILLED, HOLLOW BODIES

(75) Inventors: Johann Haas, Klosterneuburg (AT); Josef Haas, Vienna (AT); Stefan Jiraschek, Königsbrunn (AT); Norbert Drapela, Langenzersdorf (AT); Josef Hogl, Hollabrunn (AT)

(73) Assignee: Franz Haas Waffel - und Keksanlagen-Industrie GmbH, Vienna (AT)

( * ) Notice: Subject to any disclaimer, the term of this patent is extended or adjusted under 35 U.S.C. 154(b) by 584 days.

(21) Appl. No.: 11/710,393

(22) Filed: Feb. 23, 2007

(65) Prior Publication Data

US 2008/0078076 A1    Apr. 3, 2008

Related U.S. Application Data

(63) Continuation of application No. PCT/EP2005/008974, filed on Aug. 19, 2005.

(30) Foreign Application Priority Data

Aug. 23, 2004  (AT) ............... A 1417/2004
Jul. 21, 2005   (AT) ............... A 1228/2005

(51) Int. Cl.
    *B23P 19/00* (2006.01)
(52) U.S. Cl. .................... 29/822; 426/89; 426/138; 426/512; 426/514; 426/518
(58) Field of Classification Search .................. 29/282, 29/283.5, 822, 823; 426/89, 138, 512, 514, 426/516, 518; 72/409.19, 414, 416, 472; 53/397, 451, 459
See application file for complete search history.

(56) References Cited

U.S. PATENT DOCUMENTS

| | | | |
|---|---|---|---|
| 4,084,494 A | | 4/1978 | Ezaki |
| 4,689,236 A | * | 8/1987 | Pinto ..................... 426/502 |
| 4,692,109 A | | 9/1987 | Hayashi et al. |
| 5,882,710 A | * | 3/1999 | Jury ....................... 426/512 |

FOREIGN PATENT DOCUMENTS

| | | |
|---|---|---|
| DE | 203 06 828 U1 | 9/2003 |
| EP | 0 130 772 A2 | 1/1985 |
| EP | 0 659 343 A1 | 6/1995 |
| EP | 0 693 255 A1 | 1/1996 |
| EP | 0 774 209 A1 | 5/1997 |
| FR | 2 796 810 | 2/2001 |
| GB | 2 324 978 A | 11/1998 |
| WO | WO 02/071848 A1 | 9/2002 |

\* cited by examiner

*Primary Examiner*—David P Bryant
*Assistant Examiner*—Bayan Salone
(74) *Attorney, Agent, or Firm*—Laurence A. Greenberg; Werner H. Stemer; Ralph E. Locher (57) ABSTRACT

An apparatus includes a crimping device for producing individual, pillow-shaped, preferably filled, hollow bodies from plastically deformable tubes separated transversely to their longitudinal direction and delimited at opposite ends by crimped edges. The crimping device has at least one elongate crimping unit assigned to the longitudinal direction of the tubes, on which a row of crimping tools is disposed one behind the other in the longitudinal direction. Each crimping tool has a stationary crimping jaw fixed in the frame and a movable crimping jaw lying opposite to the fixed jaw in the transverse direction and disposed on a carriage movable back and forth in the transverse direction in the frame. All of the movable crimping jaws may be fastened on the carriage to actuate all of the crimping tools simultaneously and thereby separate a tube into a number of hollow bodies.

17 Claims, 9 Drawing Sheets

APPARATUS FOR PRODUCING PILLOW-SHAPED, PREFERABLY FILLED, HOLLOW BODIES

CROSS-REFERENCE TO RELATED APPLICATIONS

This is a continuation, under 35 U.S.C. §120, of copending International Application No. PCT/EP2005/008974, filed Aug. 19, 2005, which designated the United States; this application also claims the priority, under 35 U.S.C. §119, of Austria Patent Applications A 1417/2004, filed Aug. 23, 2004, and A 1228/2005, filed Jul. 21, 2005; the prior applications are herewith incorporated by reference in their entirety.

BACKGROUND OF THE INVENTION

1. Field of the Invention

The invention relates to an apparatus for producing pillow-shaped hollow bodies which are delimited at opposite ends by crimped edges.

2. Description of the Related Art

The production of edible pillow-shaped hollow bodies is known from European Patent EP 774 209 B1, corresponding to U.S. Pat. No. 5,882,710 and from International Patent Application No. WO 02/071848 A1, corresponding to Published European Patent Application EP 1 361 795.

European Patent EP 774 209 B1, corresponding to U.S. Pat. No. 5,882,710, discloses the production of the edible hollow bodies from an extruded, plastically deformable chocolate tube. After the extruder, the tube passes two stationary crimping tools, which are alternately actuated and respectively cut off a portion of the tube, protruding from the extruder, and create a horizontal or vertical crimped edge.

International Patent Application No. WO 02/071848 A1, corresponding to Published European Patent Application EP 1 361 795, discloses the production of edible hollow bodies from a baked, plastically deformable wafer tube. The latter is transported in the longitudinal direction over a horizontal transport path, along which two elongate, mutually overlapping crimping devices are disposed. They have crimping tools, which move in the longitudinal direction of the transport path, alternately come into action at the beginning of the path and cut up the wafer tube pushed into the transport path, thereby creating a horizontal or vertical crimped edge.

In both cases, the efficiency is not very high. In order to achieve a durable closure of the ends of the hollow bodies that are created by crimped edges, with all of the crimping tools it is necessary for there to be a distinct delay of the crimping operation creating the crimped edges immediately before the final severing of the respective, already laid-flat region of the tube. A precondition therefor is a slow relative movement, or a relative movement delayed by a holding time, of the two crimping jaws performing the crimping operation. As a result, however, the quantity of pillow-shaped hollow bodies that can be produced per unit of time is very greatly restricted.

SUMMARY OF THE INVENTION

It is accordingly an object of the invention to provide an apparatus for producing pillow-shaped, preferably filled, hollow bodies, which overcomes the hereinafore-mentioned disadvantages of the heretofore-known apparatuses of this general type.

With the foregoing and other objects in view there is provided, in accordance with the invention, an apparatus for simultaneously producing a plurality of pillow-shaped hollow bodies delimited at opposite ends by crimped edges. The apparatus comprises a frame, a feeding device having a drop shaft for feeding the tubes transversely relative to their longitudinal direction, and a crimping device for receiving the tubes from the feeding device and separating the tubes into pillow-shaped hollow bodies. The crimping device has at least one elongate crimping unit assigned to the longitudinal direction of the tubes, or two or more elongate crimping units disposed next to one another and assigned to the longitudinal direction of the tubes. Each crimping unit has a row of crimping tools disposed one behind the other in longitudinal direction and stationarily in the frame. The crimping tools each have a stationary crimping jaw fixed in the frame and a movable crimping jaw lying opposite to the stationary crimping jaw in transverse direction. A carriage carries the movable crimping jaw and is movable back and forth in transverse direction in the frame.

In the apparatus according to the invention, the tubes pass the drop shaft and proceed transversely relative to their longitudinal direction into an elongate crimping unit of the crimping device, in which the movable crimping jaws are retracted in the transverse direction and the crimping tools are open. In order to cut up the tubes, the movable crimping jaws are advanced in the transverse direction with the aid of the carriage carrying them and the crimping tools are closed. When this happens, all of the crimping tools of the crimping unit are always closed simultaneously. The tube introduced into an opening crimping unit is cut up in a single operation into a number of hollow bodies following one another in the longitudinal direction.

In the apparatus according to the invention, the crimping operation of the crimping tools is respectively performed by a carriage carrying the movable crimping jaw of the crimping tool. This crimping operation is controlled by the movement of the carriage concerned. The movement of the carriage may be combined with a longer holding time.

In the apparatus according to the invention, the crimping tools of the elongate crimping units are always actuated simultaneously. The movable crimping jaws of a crimping unit may be disposed on two or more carriages which can be made to move in the transverse direction and are moved synchronously back and forth to actuate the crimping tools of the crimping unit. The movable crimping jaws of a crimping unit may be disposed on a single carriage, which can be made to move in the transverse direction and with its movement cuts up the tube located in the crimping unit. A carriage that can be made to move in the transverse direction in the frame of the apparatus may carry the crimping jaws of two or more adjacent crimping units. During the movement of a carriage, the tubes located in the crimping units are then simultaneously cut up into numerous, pillow-shaped hollow bodies.

In accordance with another feature of the invention, each crimping unit may have two tool inserts extending in the longitudinal direction and lying opposite one another in the transverse direction. One tool insert thereof carries the stationary crimping jaws of the crimping tools of the crimping unit and is fixedly anchored in the frame and the other tool insert thereof carries the movable crimping jaws of the crimping tools of the crimping unit and is disposed in the frame in such a way that it can be made to move in the transverse direction.

The use of two inserts makes it easier to replace the crimping jaws and makes changing the product simpler. All that is necessary for a product change is to remove the tool inserts corresponding to the previous product and replace them with the tool inserts corresponding to the product. When doing so, it is possible for tool inserts on which the crimping jaws carry straight, vertically aligned crimping edges to be exchanged for tool inserts on which the crimping jaws are provided with differently shaped or differently aligned crimping edges. Tool inserts on which the crimping jaws respectively carry vertical or oblique crimping edges that are of the same alignment can be exchanged for tool inserts on which the crimping jaws carry crimping edges that are turned with respect to one another.

In accordance with a further feature of the invention, a crimping unit may be provided with crimping tools which follow one another in the longitudinal direction and on which the crimping jaws carry crimping edges that are turned with respect to one another from crimping tool to crimping tool, preferably turned by 90° with respect to one another. Such a formation allows the production of pillow-shaped hollow bodies which have end edges that are turned with respect to one another at opposite ends, preferably turned by 90° with respect to one another.

In accordance with an added feature of the invention, a crimping device with two elongate crimping units which are disposed next to one another in the transverse direction and can be actuated simultaneously by a carriage which can be made to move in the transverse direction, is provided. The movable crimping jaws of one crimping unit are disposed in the interior of the crimping device back-to-back with the stationary crimping jaws of the other crimping unit. The movable crimping jaws of both crimping units are disposed on the carriage. In this apparatus, two tubes can in each case be cut up simultaneously into individual hollow bodies, which permits a higher output of hollow bodies.

In accordance with an additional feature of the invention, a crimping device with two elongate crimping units which are disposed next to one another in the transverse direction and can be actuated alternately by a carriage which can be made to move in the transverse direction, is provided. The movable crimping jaws of both crimping units are disposed back-to-back in the interior of the crimping device and anchored on the carriage. The stationary crimping jaws of both crimping units, lying opposite the movable crimping jaws, are anchored in the frame of the crimping device. The alternating actuation of the two crimping units allows the time period that is respectively available for the fusing together of the pressed-flat locations of the tubes to be significantly increased, without appreciably reducing the output of hollow bodies.

In accordance with yet another feature of the invention, the two crimping units may respectively have two elongate tool inserts lying opposite one another in the transverse direction. This includes outer tool inserts that are anchored in the frame being provided for the stationary crimping jaws of the crimping units and inner tool inserts that are anchored on the carriage being provided for the movable crimping jaws of the crimping units. Such a formation makes exchange and maintenance of the crimping tools of the crimping units easier and simpler.

In accordance with yet a further feature of the invention, the carriage that can be made to move in the transverse direction may carry a covering hood, which subdivides the drop shaft of the crimping device into two partial-shafts, lying next to one another in the transverse direction.

In accordance with yet an added feature of the invention, each crimping unit may be provided with an assigned covering, which provides a stationary covering part, anchored in the frame, for the stationary crimping jaws of the crimping unit and a transversely movable covering part for the movable crimping jaws of the crimping unit. An entry slit for the tubes is disposed between the two covering parts of a crimping unit.

In accordance with yet an additional feature of the invention, a covering which has lateral covering parts, that are anchored in the frame, for the stationary crimping jaws of the two crimping units and a central covering part, which is disposed between the lateral covering parts, is anchored on the carriage and has a convex or gable-shaped upper side, for the crimping jaws of the two crimping units that are anchored on the carriage, may be provided for the two crimping units that are disposed next to one another and can be actuated alternately by a carriage which can be made to move in the transverse direction. An entry slit for the tubes is disposed on each crimping unit between the lateral covering part and the central covering part.

In accordance with again another feature of the invention, the drop shaft, feeding the tubes transversely to their longitudinal direction to a crimping device, may be delimited on at least one of its end faces by a directing device assigned to the ends of the tubes. This directing device assists the feeding of the tubes to the crimping device.

In accordance with again a further feature of the invention, each directing device may be attached to a transversely running end wall of the drop shaft and have an endless belt which is led around this end wall of the drop shaft and delimits the drop shaft at the end.

In accordance with again an added feature of the invention, the directing device may be formed as a stripping device in which a circulating endless belt strips away filling coming out of the ends of the tubes and passes it on to a belt cleaning device disposed outside the drop shaft. Such a formation is advantageous for processing filled tubes into filled pillow-shaped hollow bodies.

In accordance with again an additional feature of the invention, there are provided heatable crimping tools, on which at least the stationary crimping jaws are preferably electrically heatable. Such a formation is advantageous for the remaining closure of the crimped edges that are created by the crimping tools and delimit the pillow-shaped hollow bodies.

In accordance with a concomitant feature of the invention, each crimping unit may be provided with an infrared radiator disposed over the crimping tools for heating the crimping tools.

Other features which are considered as characteristic for the invention are set forth in the appended claims.

Although the invention is illustrated and described herein as embodied in an apparatus for producing pillow-shaped, preferably filled, hollow bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF EXEMPLARY EMBODIMENTS

Figure 1:
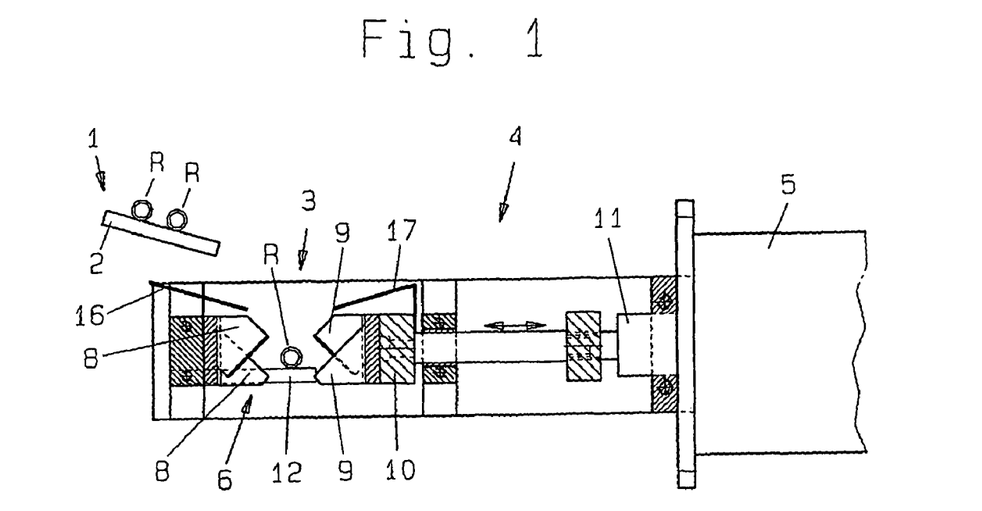
FIG. 1 is a diagrammatic, vertical-sectional view of an apparatus according to the invention equipped with only one crimping unit, with the crimping unit open.
Figure 2:
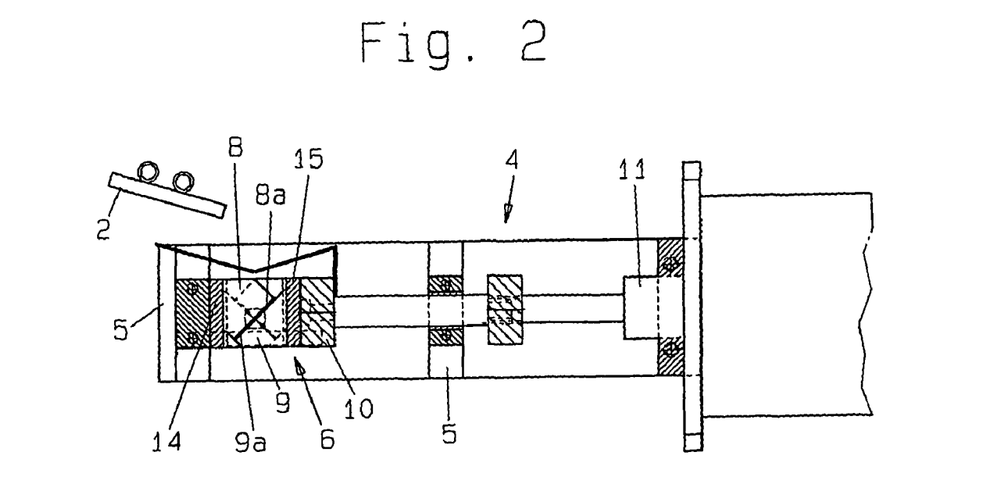
FIG. 2 is a vertical-sectional view of the apparatus of FIG. 1, with the crimping unit closed.
Figure 3:
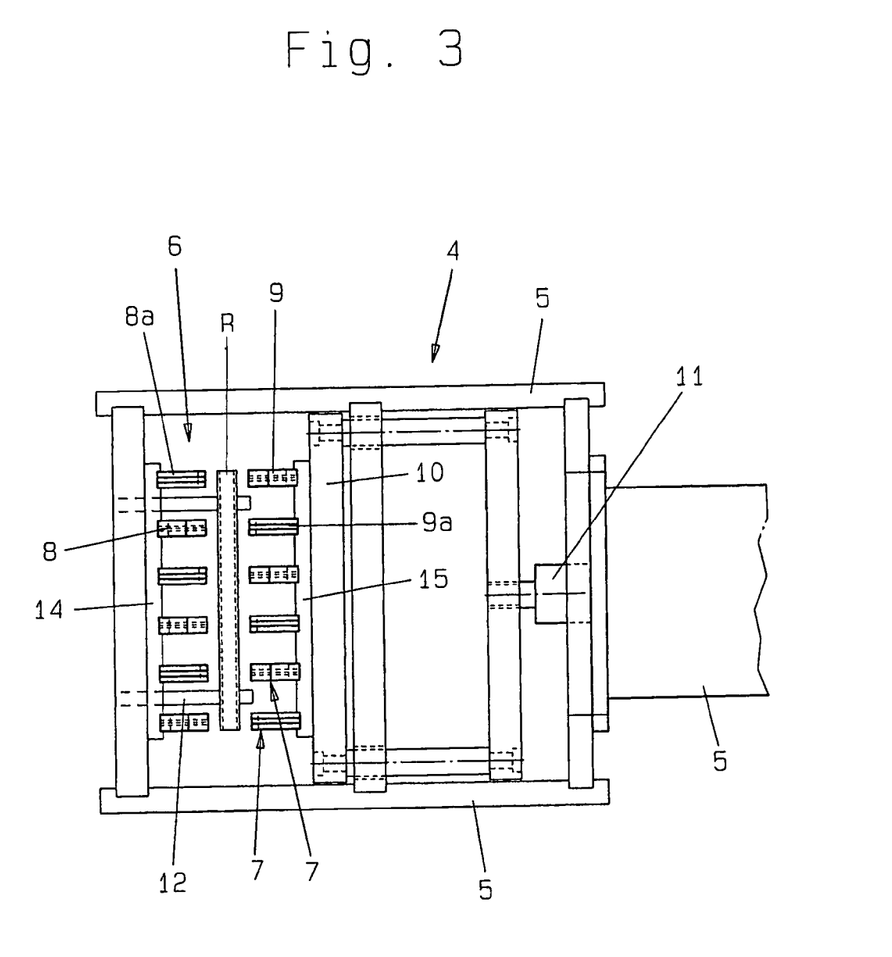
FIG. 3 is a plan view of the apparatus of FIG. 1, with the crimping unit open.

Referring now to the figures of the drawings in detail and first, particularly, to FIGS. 1-3 thereof, there is seen an apparatus for simultaneously producing a number of pillow-shaped hollow bodies from plastically deformable, filled or unfilled tubes. Tubes R are fed transversely relative to their longitudinal axis to a crimping device, in which they are divided up into individual hollow bodies which then fall downward out of the apparatus.

The apparatus includes a feeding device 1 for the tubes R. The feeding device 1 has a downward-sloping chute 2 and a drop shaft 3 adjoining the latter. The tubes are transported transversely relative to their longitudinal axis through the chute 2 to the drop shaft 3. The drop shaft 3 feeds the tubes R transversely relative to their longitudinal axis to a crimping device 4. The latter has a crimping unit 6, which is disposed stationarily in a frame 5 and has an elongate working area assigned to the longitudinal axis of the tubes. A number of crimping tools 7, respectively aligned in the transverse direction, are disposed one behind the other in the longitudinal direction along a working area. The crimping tools 7 are disposed stationarily in the frame 5.

Each crimping tool 7 has a stationary crimping jaw 8, which is fixed in the frame 5 and opposite which in the transverse direction there lies a movable crimping jaw 9. The movable crimping jaw 9 is attached on a carriage 10, which can move back and forth in the transverse direction in the frame 5. In order to open the crimping tool 7, the movable crimping jaw 9 is retracted away from the stationary crimping jaw 8 by movement of the carriage 10. In order to actuate the crimping tool 7, the movable crimping jaw 9 is advanced relative to the stationary crimping jaw 8 by the movement of the carriage 10. The movements of the carriage 10 are produced by a working cylinder 11 connected thereto.

Each crimping tool 7 may be provided with its own carriage which can move back and forth in the transverse direction. The crimping unit 6 represented in FIGS. 1-3 is provided with only a single carriage 10 which can move back and forth in the transverse direction. The carriage 10 carries the movable crimping jaws 9 of all of the crimping tools 7 disposed one behind the other in a row in the longitudinal direction in the crimping unit 6. The back and forth movements of the carriage 10 have the effect of always simultaneously actuating all of the crimping tools 7 of the crimping unit 6.

During the operation of the apparatus of FIGS. 1-3, a tube R is introduced through the use of the feeding device 1 into the crimping unit 6 and separated or cut up there in the transverse direction by actuating the crimping tools 7. The pillow-shaped hollow bodies thereby created fall downward out of the crimping unit 6. A tube R passes through the chute 2 and the drop shaft 3 into the working area of the crimping unit 6, which has been opened by retracting the carriage 10. There, it lands between the moved-apart crimping jaws 8, 9 of the crimping tools 7. In the open crimping unit 6, the tube R is caught by two lower holding arms 12, which are respectively disposed adjacent an extreme end of the crimping unit 6. The crimping unit 6 is subsequently actuated. The working cylinder 11 advances the carriage 10 in the transverse direction. The movable crimping jaws 9, fastened to the carriage 10, advance the tube R, lying on the lower holding arms 12, in the transverse direction. The movable crimping jaws 9 push the tube R against the stationary crimping jaws 8, fastened to the frame 5. During this carriage movement, the tube R is plastically deformed by each individual crimping tool 7, locally pressed together flat and severed at the pressed-flat location. After the severing of the pressed-flat regions of the tube R, the carriage 10 is retracted again in the transverse direction by the working cylinder 11 for opening the crimping unit 6. Now, the next tube R can be introduced into the opened crimping unit 6 and a new working cycle of the carriage 10 actuating the crimping tools 7 can begin.

Figure 6:
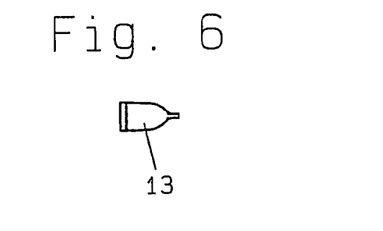
FIG. 6 is a view of a pillow-shaped hollow body with end edges turned by 90° relative to one another.

The crimping unit 6 represented in FIGS. 1-3 has crimping tools 7, 7' which are disposed one after the other in the longitudinal direction and have crimping edges 8a, 9a that are alternately turned by 45° to the left with respect to the vertical and crimping edges 8a', 9a' that are alternately turned by 45° to the right. This creates pillow-shaped hollow bodies 13 with pressed-flat end edges turned by 90° with respect to one another, as is seen in FIG. 6.

Figure 4:
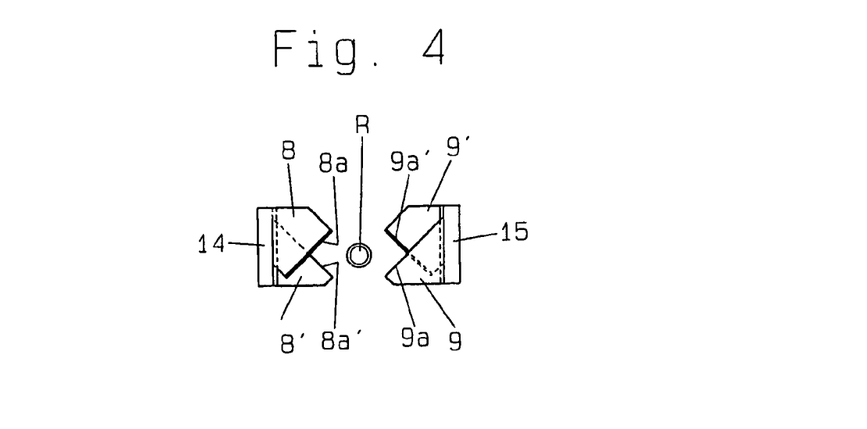
FIG. 4 is an end-elevational view of tool inserts of the crimping unit of the apparatus of FIG. 1.
Figure 5:
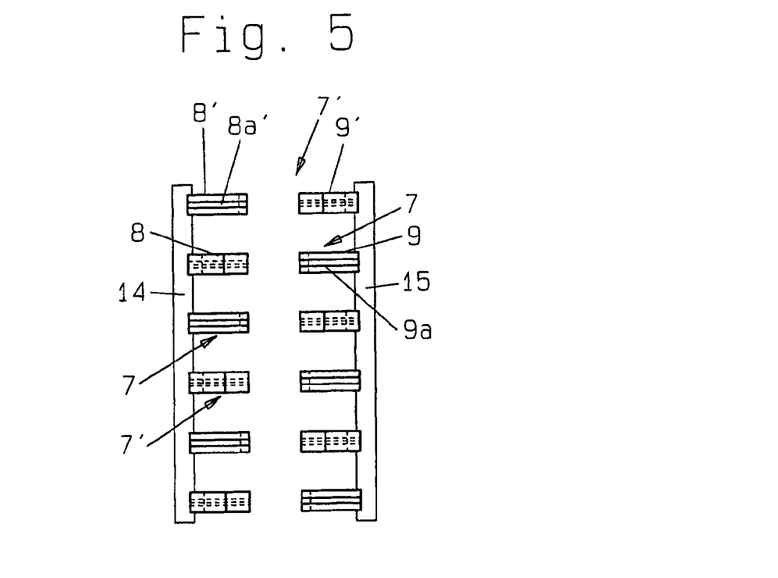
FIG. 5 is a plan view of the two tool inserts of FIG. 4.

The crimping unit 6 contains two tool inserts 14 and 15 lying opposite one another, as is seen in FIGS. 4, 5. The tool insert 14, which can be fixedly anchored in the frame 5, carries the stationary crimping jaws 8, 8' of the crimping tools 7 that are disposed one behind the other in a longitudinal row. The tool insert 15, which can be fixedly anchored in the carriage 10, carries the movable crimping jaws 9, 9' of the gripping tools 7 that are disposed one behind the other in a longitudinal row.

As is seen in FIGS. 1 and 2, the crimping device 4 is provided with a covering associated with the crimping unit 6. The covering has a stationary covering part 16, which is fastened to the frame 5 and covers over the stationary crimping jaws 8 of the crimping unit 6. The covering also has a movable covering part 17, which is fastened to the carriage 10 of the crimping unit 6 that can be made to move in the transverse direction and covers over the movable crimping jaws 9 of the crimping unit 6. The two covering parts 16, 17 form a downwardly tapering channel for the entry of the tube R into the working area of the crimping unit 6. This channel opens out on its underside into an entry slit which runs along the working area of the crimping unit 6 and is delimited by the mutually facing edges of the two covering parts 16, 17. The entry slit is opened and closed by the covering part 17, which is attached to the carriage 10 and moved along with it.

A further embodiment of an apparatus for simultaneously producing a number of pillow-shaped hollow bodies provides a crimping device in which two or more elongate crimping units, respectively assigned to the longitudinal direction of the tubes, are disposed next to one another in the transverse direction. In the case of this apparatus, the tubes are fed to the crimping device through the use of a feeding device which has feeding portions that are assigned to the individual crimping units and are provided with a drop shaft. The crimping units have elongate working areas which are assigned to the longitudinal direction of the tubes and have crimping tools disposed at intervals one behind the other. The crimping tools are respectively formed by a stationary crimping jaw and a movable crimping jaw. On adjacent crimping units, the stationary crimping jaws of one crimping unit are disposed back-to-back with the movable crimping jaws of the adjacent crimping unit. The movable crimping jaws of the crimping units are attached on a carriage which can be moved back and forth in the transverse direction and simultaneously actuates the crimping units of the crimping device. The crimping jaws may be resiliently supported on the frame or on the carriage in order to ensure a consistent crimping operation with all of the crimping tools simultaneously actuated by the carriage.

Figure 7:
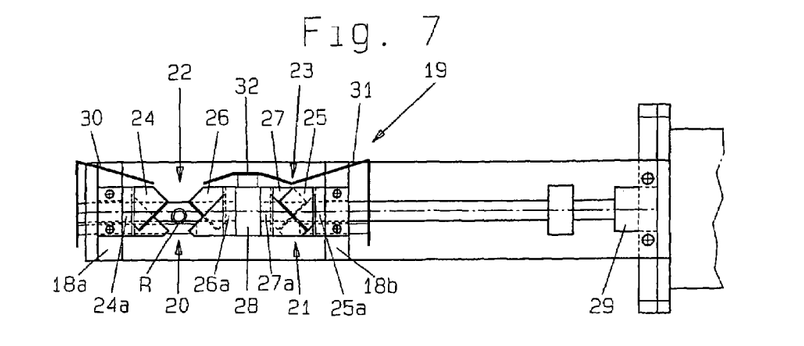
FIG. 7 is a vertical-sectional view of an apparatus according to the invention which has two crimping units lying next to one another, the left-hand crimping unit being open and the right-hand crimping unit being closed.
Figure 8:
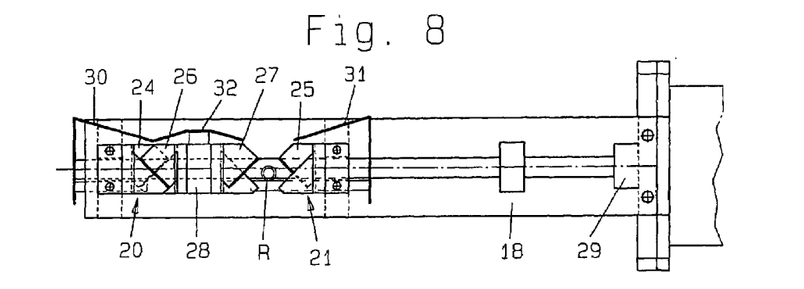
FIG. 8 is a vertical-sectional view of the apparatus of FIG. 7, with the left-hand crimping unit being closed and the right-hand crimping unit being open.
Figure 9:
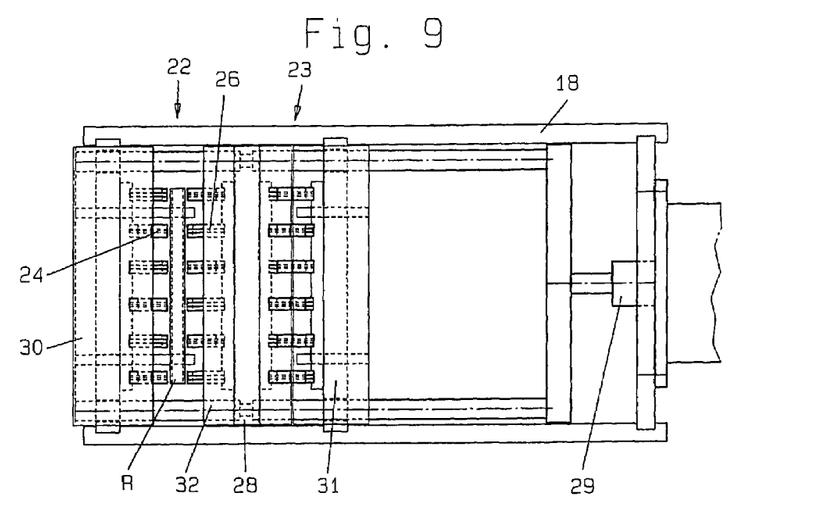
FIG. 9 is a plan view of the apparatus of FIG. 7, with the left-hand crimping unit being open and the right-hand crimping unit being closed.

FIGS. 7-9 show a crimping device 19, which is accommodated in a frame 18 and in which two elongate crimping units 20, 21 are disposed next to one another. In the frame 18, the crimping units 20, 21 are respectively delimited at their outer edges, facing away from one another, by a carrier 18a, 18b, running parallel to their longitudinal direction. The crimping units 20, 21 have working areas 22, 23, running parallel to one another, with crimping tools disposed one behind the other in the longitudinal direction. The crimping tools have crimping jaws lying opposite one another and aligned transversely relative to the longitudinal direction of the tubes R. Outer, stationary crimping jaws 24, 25 thereof are disposed at the outer edges of the crimping units 20, 21, while inner, movable crimping jaws 26, 27 thereof are anchored in the interior of the crimping device 19 on a carriage 28, which can move back and forth transversely relative to the longitudinal direction of the crimping units 20, 21. The outer crimping jaws 24, 25 respectively protrude inward from an outer tool insert 24a, 25a, which is fixedly anchored at the outer edge of the crimping unit 20, 21 on the carrier 18a and 18b, respectively, of the frame 18. The inner crimping jaws 26, 27 respectively protrude outward from an inner tool insert 26a, 27a, which is fixedly anchored on the carriage 28. The inner tool inserts 26a, 27a of the two crimping units 20, 21 are anchored facing away from one another on the carriage 28. The latter is pushed back and forth in the frame 18, transversely relative to the longitudinal direction of the crimping units 20, 21, by a working cylinder 29 connected thereto.

In the case of the crimping device 19, a covering including a number of covering parts 30, 31, 32 covers over the outer and inner tool inserts of the two crimping units 20, 21. The outer tool inserts 24a, 25a of the crimping units 20, 21 are respectively covered over by a lateral, stationary covering part 30, 31, which is fastened to the frame 18. Provided between the two stationary covering parts 30, 31 is a central covering part 32, which is attached to the carriage 28 and there covers over the inner tool inserts 26a, 27a of the two crimping units 20, 21. In the case of each crimping unit 20, 21, the lateral, stationary covering part 30, 31 forms together with the central covering part 32, which is attached to the carriage 28, a downwardly tapering channel, which opens out on its underside into an entry slit for the tubes R, which is assigned to the working area 22, 23 of the crimping unit 20, 21.

The two crimping units 20, 21 have crimping tools following one another in the longitudinal direction. The crimping edges thereof are alternately turned by 45° to the left and by 45° to the right with respect to the vertical, as is seen in FIGS. 8 and 9. The two crimping units 20, 21 create pillow-shaped hollow bodies which have flat end edges turned by 90° with respect to one another.

In the case of the crimping device 19, the two crimping units 20, 21 are alternately actuated by the carriage 28, moved alternately back and forth with the aid of the working cylinder 29, and the tubes R that are alternately fed to the crimping units 20, 21 are each respectively divided up into individual, pillow-shaped hollow bodies.

FIGS. 7 and 9 show the crimping device 19 with the carriage 28 displaced to the right, after the actuation of the right-hand crimping unit 21. If the carriage 28 as shown in FIGS. 7 and 9 is displaced to the left, the left-hand crimping unit 20 is actuated and the right-hand crimping unit 21 is opened. In the left-hand crimping unit 20, the movable crimping jaws 26 are moved relative to the stationary crimping jaws 24 and the tube R disposed between them is locally pressed together flat and divided up into pillow-shaped hollow bodies. The central covering part 32 is moved to the left with the carriage 28. As a result, the entry slit of the left-hand crimping unit 20, disposed to the left of the central covering part 32, is closed and the entry slit of the right-hand crimping unit 21, disposed to the right of the central covering part 32, is opened. In the case of the right-hand gripping unit 21, the movable crimping jaws 27 are moved to the left with the carriage 28 and moved away from the stationary crimping jaws 25. After the actuation of the left-hand crimping unit 20, the carriage 28 in the crimping device 19 is displaced to the left and assumes the position shown in FIG. 8. The next tube R is fed to the open, right-hand crimping unit 21. If the carriage 28 in FIG. 8 is displaced to the right, now the right-hand crimping unit 21 is actuated and the left-hand crimping unit 20 is opened. In the case of the right-hand crimping unit 21, the movable crimping jaws 27 are moved to the right, toward the stationary crimping jaws 25, and the tube R disposed between the crimping jaws 25, 27 is locally pressed together flat and divided up into pillow-shaped hollow bodies. The central covering part 32 is moved to the right with the carriage 28. As a result, the entry slit of the right-hand crimping unit 21, disposed to the right of the central covering part 32, is closed and the entry slit of the left-hand crimping unit 20, disposed to the left of the central covering part 32, is opened. At the same time, in the case of the left-hand crimping unit 20, the movable crimping jaws 26 are moved to the right and moved away from the stationary crimping jaws 24.

In the case of the crimping device 19, in comparison with that of FIGS. 1-3 and given the same throughput of tubes, approximately twice as much time is available for achieving a permanent connection of the tube walls lying one on top of the other at the locations of the tubes R respectively pressed flat by the crimping tools.

Figure 10:
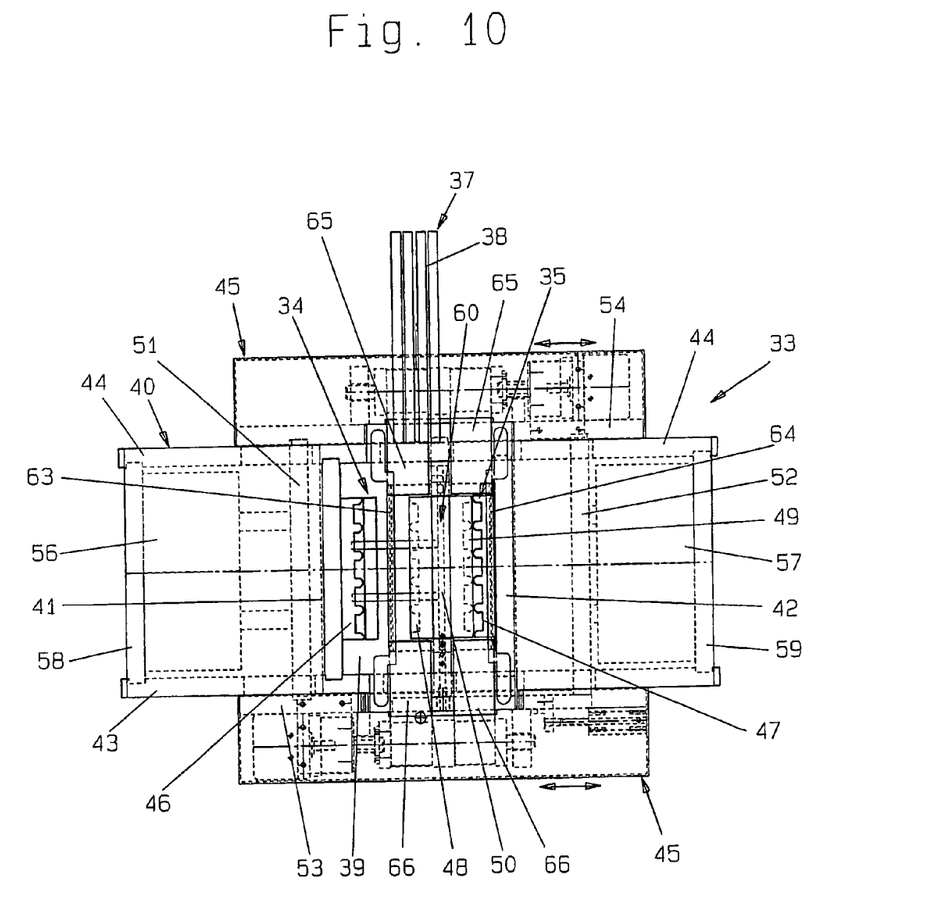
FIG. 10 is a plan view of a further apparatus according to the invention, which has two crimping units disposed next to one another, the left-hand crimping unit of which is open and the right-hand crimping unit of which is closed.
Figure 11:
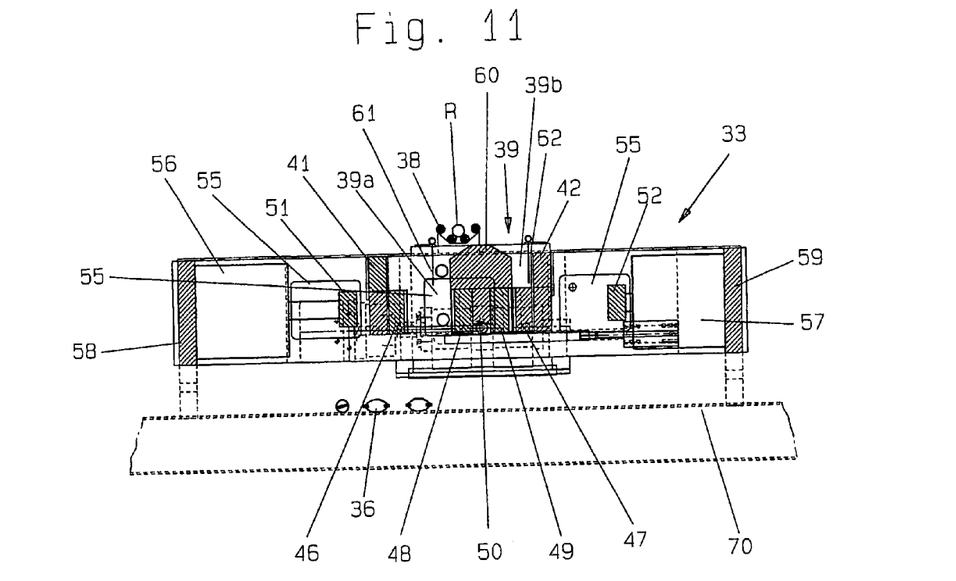
FIG. 11 is a vertical-sectional view of the apparatus of FIG. 10, running transversely relative to the longitudinal direction of the crimping units.
Figure 12:
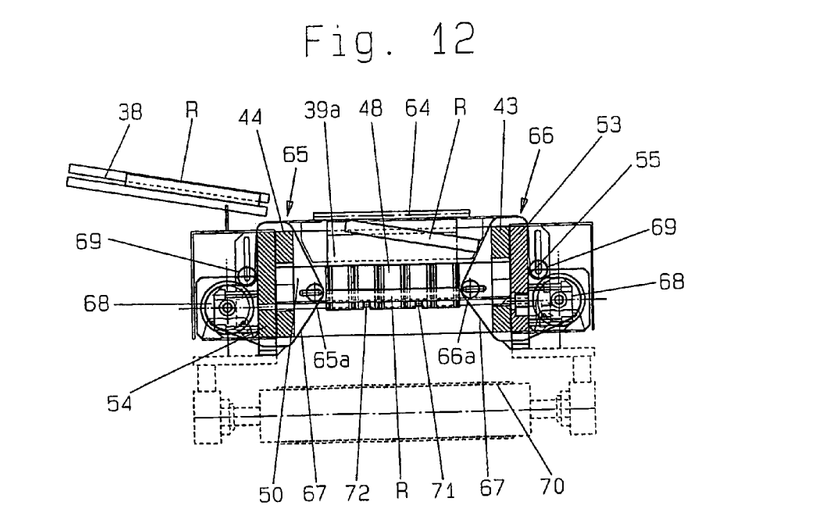
FIG. 12 is a vertical-sectional view of a crimping unit of the apparatus of FIG. 10.

FIGS. 10-12 show an apparatus in which plastically deformable tubes R are fed in the longitudinal direction to a crimping device 33 and are alternately processed in the latter in elongate crimping units 34, 35 lying next to one another. In the crimping units 34, 35, the tubes R are severed transversely relative to their longitudinal direction and divided up into pillow-shaped hollow bodies 36, which fall downward out of the respective crimping unit 34, 35.

The tubes R are introduced into the crimping device 33 through the use of a feeding device 37 extending in the longitudinal direction of the crimping units 34, 35 and are fed there to the working area of the crimping device 33, in which the two crimping units 34, 35 are disposed next to one another transversely relative to their longitudinal direction. The feeding device 37 has a downward-sloping chute or tube 38 and a drop shaft 39 disposed thereafter. The chute 38 is disposed ahead of the crimping device 33. The drop shaft 39 is disposed over the working area of the crimping device 33. The tubes R slide in the longitudinal direction over the chute 38 into the drop shaft 39, in which they are fed transversely relative to the longitudinal direction to the crimping units 34, 35.

The crimping device 33 is accommodated in a box-shaped frame 40, which with two carriers 41, 42 running parallel to the longitudinal direction of the crimping units 34, 35, laterally delimits the working area of the crimping device 33, in which the two crimping units 34, 35 are disposed next to one another transversely relative to their longitudinal direction. The carriers 41, 42 are connected to a front wall 43 and a rear wall 44 of the frame 40. They respectively form an outer edge of the directly adjacent crimping unit 34, 35. The crimping units 34, 35 are alternately actuated by a carriage 45, which can move back and forth transversely relative to the longitudinal direction of the crimping units 34, 35 in the frame 40.

The crimping units 34, 35 have working areas running parallel to one another with crimping tools disposed one behind the other in the longitudinal direction. The crimping tools have vertically aligned crimping jaws lying opposite one another. Provided at the outer edges of the crimping units 34, 35 are stationary, inwardly directed crimping jaws, lying opposite which there are inwardly directed, movable crimping jaws, disposed in the interior of the crimping device 33. The outer crimping jaws are formed by elongate, outer tool strips 46, 47, which on each crimping unit 34, 35 are fastened to the carrier 41, 42 of the frame 40 that forms its outer edge. The inner transverse jaws are formed by elongate, inner tool strips 48, 49, which are disposed facing away from one another on a central bearing arm 50 of the carriage 45. This bearing arm 50 runs in the interior of the crimping device 33 parallel to the longitudinal direction of the two crimping units 34, 35.

The carriage 45 has two lateral bearing arms 51, 52 which, as seen in FIG. 10, are disposed to the left and right of the working area of the crimping device 33. The central bearing arm 50 and the two lateral bearing arms 51, 52 are connected to one another outside the frame 40 by longitudinal carriers 53, 54, which are adjacent the front wall 43 and the rear wall 44, respectively, of the frame 40. Through-openings 55 for the bearing arms 50, 51, 52 that are respectively elongate in the direction of movement of the carriage 45, are provided in the front wall 43 and in the rear wall 44 of the frame 40.

The carriage 45 is alternately moved back and forth in the frame 40 by moving members 56, 57 acting on its lateral bearing arms 51, 52. The moving members 56 acting on its left-hand, lateral bearing arm 51 are supported in the frame 40 on a left-hand, lateral end wall 58. The moving members 57 acting on its right-hand, lateral bearing arm 52 are supported in the frame 40 on a right-hand, lateral end wall 59.

An elongate covering hood 60 is fastened to the central bearing arm 50 of the carriage 45. The covering hood 60 covers over the inner tool strips 48, 49 of the two crimping units 34, 35. The covering hood 60 reaches up to the upper side of the drop shaft 39 and subdivides the latter into partial-shafts 39a, 39b respectively assigned to a crimping unit 34, 35. An upper side of the covering hood 60 is made to slope away toward the partial-shafts 39a, 39b.

The carriage 45 has vertical baffles 61, 62 running parallel to the covering hood 60. The baffles 61, 62 delimit the partial-shafts 39a, 39b on their outer side. The baffles 61, 62 are fastened to carriers 63, 64, which are rigidly connected to the longitudinal carriers 53, 54 of the carriage 45 and are disposed parallel to the longitudinal direction of the crimping units 34, 35.

The carriage 45 carriers directing devices 65, 66 for the ends of the tubes R, which are attached to its longitudinal carriers or members 53, 54 and assigned to the end faces of the partial-shafts 39a, 39b. The directing devices 65, 66 are disposed on end faces of the crimping units 34, 35. Each directing device 65, 66 has an endless belt 67. The latter is led around the longitudinal carrier or member 53, 54 of the carriage 45 carrying the directing devices 65, 66. The belt 67 is assigned a belt drive 68 and a belt tensioning device 69. The belt drive 68 and the belt tensioning device 69 are attached to the outer side of the longitudinal carrier 53, 54. The belt 67 may also be assigned a belt cleaning device attached to the outer side of the longitudinal carrier 53, 54. On the inner side of the longitudinal carrier 53, 54, the belt 67 is led over a deflecting roller 65a, 66a, which is parallel to the longitudinal carrier 53, 54 and disposed on the central bearing arm 50 of the carriage 45 adjacent the extreme ends of the inner tool strips 48, 49 of the crimping units 34, 35.

A circulating transport belt 70, which is provided under the frame 40, catches the pillow-shaped hollow bodies 36 falling downward out of the crimping units 34, 35 and transports them away.

FIGS. 10 and 11 show the crimping device 33 with the carriage 45 displaced to the right. In this state of the crimping device 33, the inner tool strips 48, 49 of the two crimping units 34, 35 and the covering hood 60 disposed in the drop shaft 39 have been displaced to the right together with the central bearing arm 50 of the carriage 45 in the working area of the crimping device 33. The left-hand crimping unit 34 is open. The right-hand crimping unit 35 is closed. The left-hand partial-shaft 39a is aligned with the chute 38. The right-hand partial-shaft 39b is blocked by the covering hood 60.

A tube R fed through the chute 38 is diverted by the covering hood 60 into the left-hand partial-shaft 39a and falls into the open, left-hand crimping unit 34, where it is caught by two lower bearing arms 71, 72 and, when the crimping unit 34 is actuated, is divided or cut up into pillow-shaped hollow bodies 36, which fall downward onto the transport belt 70.

In order to actuate the left-hand crimping unit 34, the moving members 57 acting on the right-hand, lateral bearing arm 52 of the carriage 45 are actuated and the carriage 45 is displaced to the left as seen in FIGS. 10 and 11. As this happens, the inner tool strips 48, 49 of the two crimping units 34, 35 and the covering hood 60 disposed in the drop shaft 39 are displaced to the left together with the central bearing arm 50 of the carriage 45 in the working area of the crimping device 33. In the left-hand crimping unit 34, the tube R, lying on the lower bearing arms 71, 72, is pushed by the inner tool strip 48, which is anchored on the central bearing arm 50 of the carriage 45, to the left and against the outer tool strip 46, which is disposed at the left-hand edge of the crimping unit 34 and is fastened to the carrier 41 of the frame 40. On the right-hand crimping unit 35, the inner tool strip 49 is pushed away to the left by the outer tool strip 47, which is disposed at the right-hand edge of the crimping unit 35 and is fastened to the carrier 42 of the frame 40. In the drop shaft 39, the covering hood 60 is displaced to the left.

After the actuation of the left-hand crimping unit 34, the right-hand partial-shaft 39b is aligned with the chute 38 and the covering hood 60 blocks the left-hand partial-shaft 39a.

The next tube R, fed through the chute 38, is diverted by the covering hood 60 into the right-hand partial-shaft 39b and falls into the open, right-hand crimping unit 35, where it is caught by two lower bearing arms and, when the crimping unit 35 is actuated, is cut up into pillow-shaped hollow bodies 36, which fall downward onto the transport belt 70.

In order to actuate the right-hand crimping unit 35, the moving members 56 acting on the left-hand, lateral bearing arm 51 of the carriage 45 are actuated and the carriage 45 is displaced to the right as seen in FIGS. 10 and 11. As this happens, the inner tool strips 48, 49 of the two crimping units 34, 35 and the covering hood 60 disposed in the drop shaft 39 are displaced to the right together with the central bearing arm 50 of the carriage 45 in the working area of the crimping device 33. In the right-hand crimping unit 35, the tube R, lying on the lower bearing arms, is pushed by the inner tool strip 49, which is anchored on the central bearing arm 50 of the carriage 45, to the right and against the outer tool strip 47, which is disposed at the right-hand edge of the crimping unit 35 and is fastened to the carrier 42 of the frame 40. On the left-hand crimping unit 34, the inner tool strip 48 is pushed away to the right by the outer tool strip 46, which is disposed at the left-hand edge of the crimping unit 34 and is fastened to the carrier 41 of the frame 40. In the drop shaft 39, the covering hood 60 is displaced to the right.

After the actuation of the right-hand crimping unit 35, the left-hand partial-shaft 39a is aligned again with the chute 38 and the covering hood 60 blocks the right-hand partial-shaft 39b again.

The tool strips 46, 47, 48, 49 of the two crimping units 34, 35 carry crimping jaws with straight, vertically aligned crimping edges. They can be exchanged for tool strips with other crimping edges or for tool strips with differently aligned crimping edges, in order to create pillow-shaped hollow bodies with different end edges. Other than exchanging the tool strips of the crimping units 34, 35, no changes to the crimping device 33 are required for this to occur.

Figure 13:
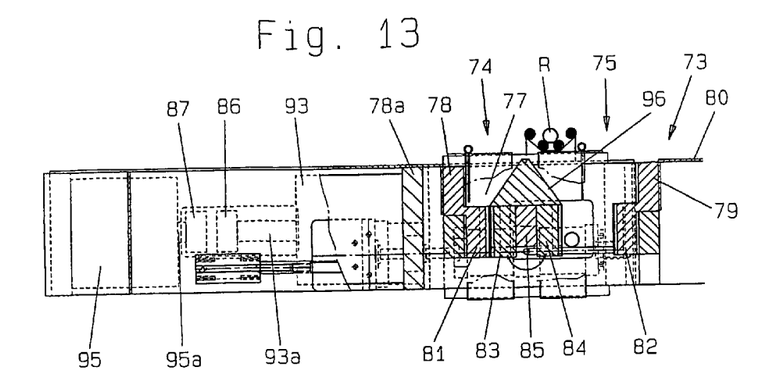
FIG. 13 is a vertical-sectional view of a further apparatus according to the invention, which has two crimping units disposed next to one another, the left-hand crimping unit of which is closed and the right-hand crimping unit of which is open.
Figure 14:
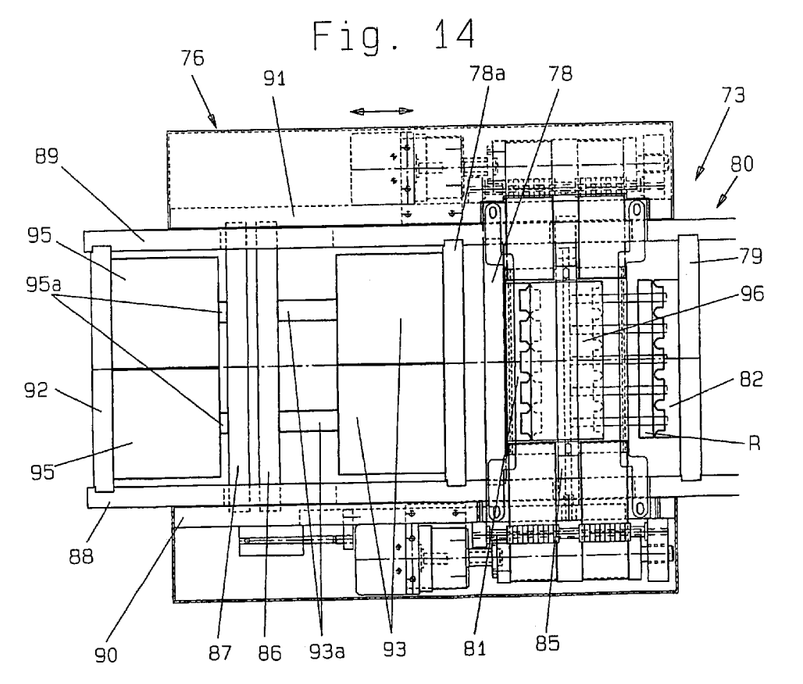
FIG. 14 is a plan view of the apparatus of FIG. 13.

FIGS. 13 and 14 show a further apparatus in which plastically deformable tubes R are fed in the longitudinal direction to a crimping device 73 and are processed in the latter, in two elongate crimping units 74, 75 lying next to one another. The tubes R are respectively severed transversely relative to their longitudinal direction and divided up into pillow-shaped hollow bodies in the crimping units 74, 75. The crimping units 74, 75 are alternately actuated by a carriage 76, which can move back and forth transversely relative to its longitudinal direction. The crimping device 73 largely corresponds to the crimping device 33 of FIGS. 10-12.

In the case of the crimping device 73, the working area along with a drop shaft 77 lies between two carriers 78, 79 of a frame 80 that run in the longitudinal direction of the crimping units 74, 75. These carriers 78, 79 are disposed in the right-hand half of the frame 80. They carry outer tool strips 81, 82 of the two crimping units 74, 75 on their mutually facing sides. Inner tool strips 83, 84 of the crimping units 74, 75 are disposed back-to-back in the interior of the working area of the crimping device 73. The inner tool strips 83, 84 are borne by a bearing arm 85 of the carriage 76 that is parallel to the longitudinal direction of the crimping units 74, 75. This bearing arm 85 is disposed in the right-hand half of the carriage 76. The carriage 76 has two bearing arms 86, 87, which are disposed in its left-hand half and lie closely next to one another there, parallel to the longitudinal direction of the crimping units 74, 75, and on which working cylinders that displace the carriage 76 to the left and to the right in FIGS. 13 and 14 respectively act.

The bearing arms 85, 86, 87 of the carriage 76 pass through a front wall 88 and a rear wall 89 of the frame 80. They are part of a carriage bearing frame and are connected to one another outside the frame 80 by bearing arms 90, 91 of the carriage 76 running transversely relative to the longitudinal direction of the crimping units 74, 75.

The two left-hand bearing arms 86, 87 of the carriage 76 are disposed in the frame 80 between a right-hand transverse wall 78a, which is adjacent the carriers 78, and a left-hand end wall 92. Two hydraulic working cylinders 93, which are attached on the left-hand side of the right-hand transverse frame wall 78a, displace the carriage to the left into the position shown in FIGS. 13 and 14. These working cylinders 93 act with working rams 93a thereof on the right-hand side of the first, left-hand bearing arm 86 of the carriage 76. Two hydraulic working cylinders 95, which are attached on the right-hand side of the left-hand frame end wall 92, displace the carriage to the right out of the position shown in FIGS. 13 and 14. The working cylinders 95 act with working rams 95a thereof on the left-hand side of the second, left-hand bearing arm 87 of the carriage 76.

Figure 15:
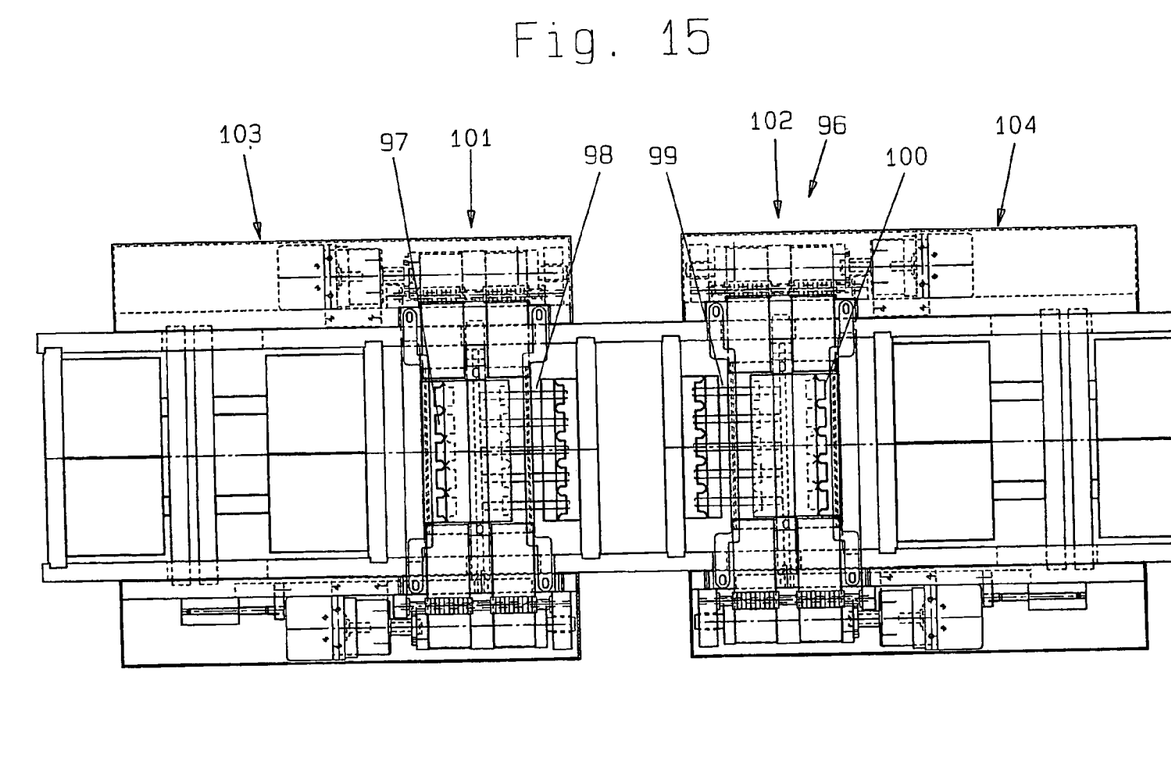
FIG. 15 is a plan view of an apparatus according to the invention with four crimping units disposed next to one another.

In the working area of the crimping device 73, a covering hood 96 with a convex or gable-shaped upper side is disposed over the two inner tool strips 83, 84 of the crimping units 74, 75. The covering hood 96 is formed in one piece with the two tool strips 83, 84. The tool strips 83, 84 and the covering hood 96 form an elongate block, which straddles the right-hand bearing arm 85 of the carriage 76 that is parallel to the longitudinal direction of the crimping units 74, 75. This block subdivides the drop shaft 77 into two partial-shafts. The crimping jaws of the two inner tool strips 83, 84 that follow one another in the longitudinal direction, are respectively disposed on the two longitudinal sides of this block that are parallel to the longitudinal direction of the crimping units 74, 75. In order to clean or exchange the inner tool strips 83, 84, the block is merely lifted off the right-hand bearing arm 85 of the carriage 76 and then the cleaned block or a block provided with other tool strips is placed on the right-hand bearing arm 85 of the carriage 76. FIG. 15 shows a further apparatus for processing plastically deformable tubes R into pillow-shaped hollow bodies. The tubes are fed in the longitudinal direction to a crimping device 96, which has four elongate crimping units 97, 98, 99, 100, in which the tubes are respectively severed transversely relative to their longitudinal direction and divided up into pillow-shaped hollow bodies. The crimping device 96 has two working areas 101, 102, which lie next to one another some distance apart and are disposed in two portions of the crimping device 96 that are formed in mirror image of each other. In each working area 101 and 102, two elongate crimping units 97, 98 and 99, 100 are respectively disposed next to one another, transversely relative to their longitudinal direction. Each working area 101 and 102 is respectively assigned a carriage 103 and 104, which can move back and forth transversely relative to the longitudinal direction of the crimping units and alternately actuates the two crimping units 97, 98 and 99, 100 of the respective working area 101 and 102. The left-hand portion of the crimping device 96 corresponds to the crimping device of FIGS. 13 and 14. The right-hand portion of the crimping device 96 is formed as a mirror image thereof. The carriages 103, 104 of the two working areas 101, 102 are moved back and forth independently of one another. The two carriages 103, 104 may also be replaced by a single carriage, which then respectively actuates the left-hand crimping units 97, 99 of the two working areas 101, 102 and the right-hand crimping units 98, 100 of the two working areas 101, 102 simultaneously.

FIGS. 16-20 show various tool inserts for the crimping units and the pillow-shaped hollow bodies that are produced by these tool inserts from a tube R.

Figure 16:
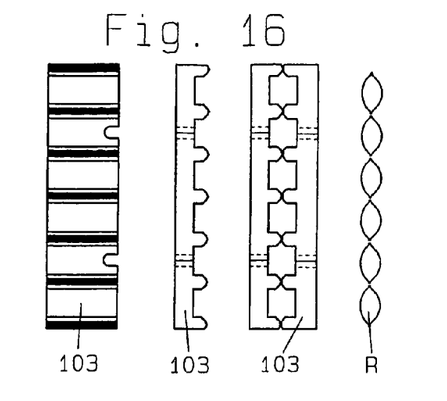
FIGS. 16-20 each include different views of various tool inserts for the crimping units and the pillow-shaped hollow bodies produced with these tool inserts from a tube R.

FIG. 16 shows a tool insert which provides two identically formed tool strips 103 lying opposite one another. Each tool strip 103 has seven crimping jaws, disposed at a distance from one another and protruding perpendicularly. The tubes are divided up into six pillow-shaped hollow bodies in a crimping unit fitted with this tool insert.

Figure 17:
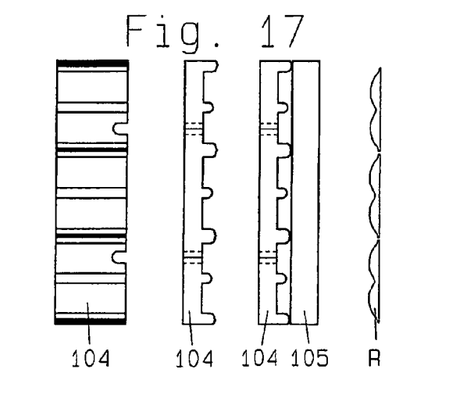

FIG. 17 shows a tool insert on which a flat tool strip 105 lies opposite a tool strip 104 provided with protruding crimping jaws. The tool strip 104 has seven crimping jaws, disposed at a distance from one another and protruding perpendicularly, every second crimping jaw of which is made somewhat shorter. In a crimping unit fitted with this tool insert, the tubes are pressed flat on one side and only cut up at every second pressed-flat location, so that only three pillow-shaped hollow bodies are created.

Figure 18:
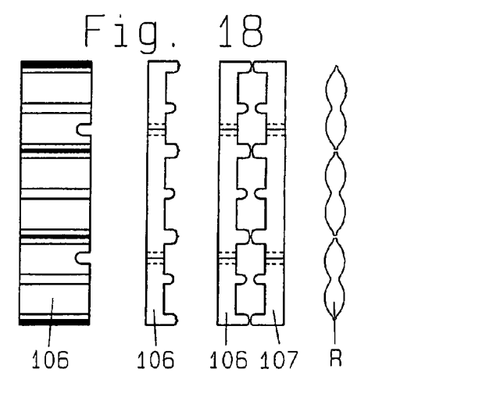

FIG. 18 shows a tool insert with two identically formed tool strips 106, 107, each with seven perpendicularly protruding crimping jaws, only every second crimping jaw of which, however, cuts up the tube at the pressed-flat location. In a crimping unit fitted with this tool insert, three elongate pillow-shaped hollow bodies, which respectively include two pillows connected to one another at a crimped edge, are created from each tube.

Figure 19:
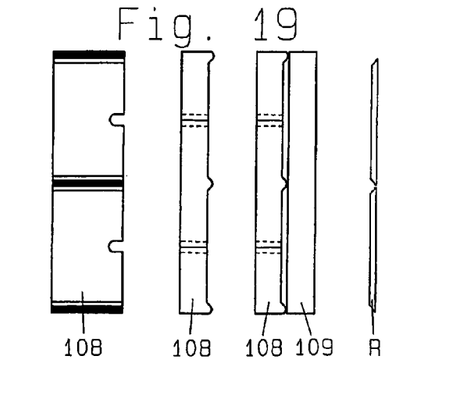

FIG. 19 shows a tool insert on which a flat tool strip 109 without protruding crimping jaws lies opposite a tool strip 108 with three protruding crimping jaws. The crimping jaws are disposed in the center and at the two ends of the tool strip 108. In a crimping unit fitted with this tool insert, each tube is pressed with one side against the flat tool strip 109, closed at both ends by the crimping edge and first locally pressed flat in the center and then cut up at the pressed-flat location, so that two pillow-shaped hollow bodies are created therefrom.

Figure 20:
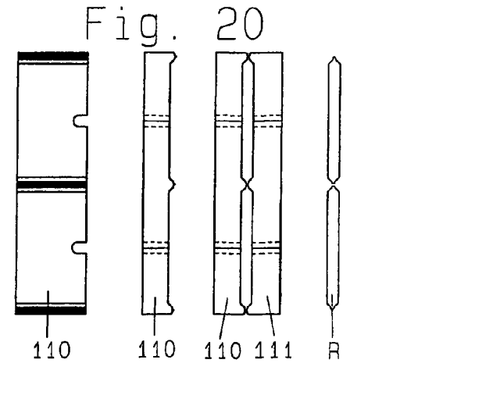

FIG. 20 shows a further tool insert with two identically formed tool strips 110, 111. On both tool strips 110, 111, a crimping jaw respectively protrudes perpendicularly at both ends and in the center. In a crimping unit fitted with this tool insert, each tube is divided up into two pillow-shaped hollow bodies that are respectively closed at the ends by crimped edges.

Figure 21:
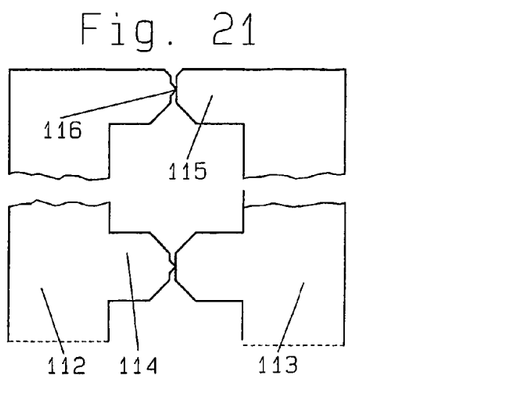
FIG. 21 is a fragmentary view of a tool insert.

FIG. 21 shows a further tool insert in which two tool strips 112, 113 with perpendicularly protruding crimping jaws 114, 115 lie opposite one another. The left-hand tool strip has crimping jaws 114, which are provided with a planar end face and a cutting edge 116 protruding beyond the latter. The right-hand tool strip 113 has crimping jaws 115, which are provided with a planar end face. In a crimping unit fitted with this tool insert, each tube is pressed flat between the crimping jaws 114, 115 of the tool inserts 112, 113 that lie opposite one another and is severed at a pressed-flat location by the cutting edge 116 protruding from the crimping jaw 114.

We claim:

1. An apparatus for simultaneously producing a plurality of pillow-shaped hollow bodies delimited at opposite ends by crimped edges, the apparatus comprising:
    a frame;
    a feeding device having a drop shaft for feeding the tubes transversely relative to their longitudinal direction;
    a crimping device for receiving the tubes from said feeding device and separating the tubes into pillow-shaped hollow bodies;
    said crimping device having at least one elongate crimping unit assigned to the longitudinal direction of the tubes;
    said at least one crimping unit having a row of crimping tools disposed one behind the other in longitudinal direction in said frame;
    said crimping tools each having a stationary crimping jaw fixed in said frame and a movable crimping jaw lying opposite to said stationary crimping jaw in transverse direction; and
    a carriage carrying said movable crimping jaw, said carriage being movable back and forth in transverse direction in said frame.

2. The apparatus according to claim 1, wherein said at least one crimping unit includes two or more crimping units disposed next to one another and assigned to the longitudinal direction of the tubes.

3. The apparatus according to claim 1, wherein said at least one crimping unit has two tool inserts extending in the longitudinal direction and lying opposite one another in the transverse direction, one of said tool inserts carrying said stationary crimping jaws of said crimping tools of said crimping unit and being fixedly anchored in said frame and the other of said tool inserts carrying said movable crimping jaws of said crimping tools of said crimping unit and being movable in the transverse direction in said frame.

4. The apparatus according to claim 1, wherein said crimping jaws of said crimping tools following one another in the longitudinal direction in said crimping unit have crimping edges being turned relative to one another from crimping tool to crimping tool.

5. The apparatus according to claim 4, wherein said crimping edges are turned by 90° relative to one another.

6. The apparatus according to claim 1, wherein said crimping device has two elongate crimping units disposed next to one another in the transverse direction for actuation simultaneously by said carriage movable in the transverse direction, said movable crimping jaws of one of said crimping units being disposed in the interior of said crimping device back-to-back with said stationary crimping jaws of the other of said crimping units, and said movable crimping jaws of both of said crimping units being disposed on said carriage.

7. The apparatus according to claim 1, wherein said crimping device has two elongate crimping units disposed next to one another in the transverse direction for actuation alternately by said carriage being movable in the transverse direction, said movable crimping jaws of both of said crimping units being disposed back-to-back in the interior of said crimping device and anchored on said carriage, and said stationary crimping jaws of both of said crimping units, lying opposite said movable crimping jaws, being anchored in said frame of said crimping device.

8. The apparatus according to claim 7, wherein said two crimping units of said crimping device each have two respective elongate tool inserts lying opposite one another in the transverse direction, said tool inserts including outer tool inserts anchored in said frame for said stationary crimping jaws of said crimping units and inner tool inserts anchored on said carriage for said movable crimping jaws of said crimping units.

9. The apparatus according to claim 7, wherein said carriage being movable in the transverse direction has a covering hood subdividing said drop shaft into two partial-shafts lying next to one another in the transverse direction.

10. The apparatus according to claim 7, which further comprises:
    a covering for said two crimping units disposed next to one another for actuation alternately by said carriage movable in the transverse direction;

said covering having lateral covering parts anchored in said frame, for said stationary crimping jaws of said two crimping units; and said covering having a central covering part disposed between said lateral covering parts, anchored on said carriage and having a convex or gable-shaped upper side, for said crimping jaws of said two crimping units anchored on said carriage;

said lateral covering part and said central covering part of each of said crimping units defining an entry slit therebetween for the tubes.

11. The apparatus according to claim 1, wherein said at least one crimping unit has a covering including a stationary covering part anchored in said frame for said stationary crimping jaws of said at least one crimping unit and a transversely movable covering part for said movable crimping jaws of said at least one crimping unit, said stationary and movable covering parts of said at least one crimping unit defining an entry slit therebetween for the tubes.

12. The apparatus according to claim 1, which further comprises a directing device assigned to ends of the tubes, said drop shaft, feeding the tubes transversely to their longitudinal direction to said crimping device, having at least one end face delimited by said directing device.

13. The apparatus according to claim 12, wherein said drop shaft has an end and a transversely extended end wall, and said directing device is attached to said end wall and has an endless belt led around said end wall and delimiting said end of said drop shaft.

14. The apparatus according to claim 13, wherein said directing device is a stripping device in which said endless belt circulates and strips away filling coming out of ends of the tubes for passing the filling on to a belt cleaning device disposed outside said drop shaft.

15. The apparatus according to claim 1, wherein said crimping tools are heatable, and at least said stationary crimping jaws are heatable on said crimping tools.

16. The apparatus according to claim 15, wherein said crimping tools are electrically heatable.

17. The apparatus according to claim 1, wherein said at least one crimping unit has an infrared radiator disposed over said crimping tools for heating said crimping tools.

* * * * *